United States Patent [19]

Kwon et al.

[11] Patent Number: 6,054,151
[45] Date of Patent: Apr. 25, 2000

[54] CHEESE FLAVOR

[75] Inventors: Steven Soon-Young Kwon; Claude Lecouteux; Dharam Vir Vadehra, all of New Milford, Conn.

[73] Assignee: Nestec S.A., Vevey, Switzerland

[21] Appl. No.: 09/096,069

[22] Filed: Jun. 11, 1998

[51] Int. Cl.⁷ .................. A23C 20/00; A23C 19/084; A23C 19/06
[52] U.S. Cl. .................. 426/36; 426/35; 426/38; 426/42; 426/43
[58] Field of Search .................. 426/34, 35, 36, 426/38, 42, 43, 61, 63, 533, 650, 582

[56] References Cited

U.S. PATENT DOCUMENTS 4,595,594   6/1986   Lee et al. .................. 426/35

FOREIGN PATENT DOCUMENTS 59-113 869   6/1984   Japan .

Primary Examiner—Keith D. Hendricks
Attorney, Agent, or Firm—Pennie & Edmonds LLP

[57] ABSTRACT

A process for the preparation of a Parmesan or cheese flavor which comprises ripening cheese curds with a protease, lipase and *Lactobacillus helveticus* and/or *Lactococcus lactis*.

12 Claims, No Drawings

CHEESE FLAVOR

FIELD OF THE INVENTION

The present invention relates to the production of a cheese flavor more particularly to a natural intensified Parmesan or cheese flavor produced from cheese curds or cheese blocks. The product can be used to impart a cheese-like flavour to culinary products such as sauces, snacks, etc.

BACKGROUND OF THE INVENTION

Japanese Examined Patent No.54-24459 describes a method of producing a desirable cheese flavor in which cheese curd or crumbled green cheese is subjected to the action of proteolytic enzymes and lactic acid bacteria by accomplishing maturation in a short time.

The problem involved in producing strong cheese flavors is that a strong bitter flavour is produced by the proteolytic enzymes in the process of degrading the casein which is the primary protein in cheese.

Japanese Patent Application No. 59-113869 describes a method for producing a strong cheese flavor by acting a proteolytic enzyme, a lipolytic enzyme and lactic acid bacteria on cheese curd or crumbled cheese, neutral protease produced by *Penicillium camemberti* being used as the proteolytic enzyme and an esterase from the abomasum of a young mammal being used as the lipolytic enzyme. A strong cheese flavor is said to be produced without any unacceptable bitterness. The fermentation is stated to be carried out over a period of from 7–10 days.

SUMMARY OF THE INVENTION

We have found that by using a protease, a lipase and *Lactobacillus helveticus* and/or *Lactococcus* for the ripening of cheese curds, a strong flavor without bitterness may be produced in less than 6 days.

According to the present invention, there is provided a process for the preparation of a Parmesan or cheese flavor which comprises ripening cheese curds with a protease, lipase and *Lactobacillus helveticus* and/or *Lactococcus lactis*.

DETAILED DESCRIPTION OF THE INVENTION

The cheese curds are preferably cheddar cheese curds, or Cheddar or Parmesan cheese blocks.

The protease is preferably a neutral protease, e.g. Protease P Amano 6 a neutral protease derived from *Aspergillus melleus* manufactured by the Amano Enzyme Co., or Neutrase a neutral protease derived from *B. Subtilis* var. *Amyloliquefaciens* or Flavourzyme a neutral fungal protease derived from *Aspergillus oryzae* manufactured by Novo Nordisk, Inc. A mixture of one or more proteases may be used if desired. Salt may be added, if desired.

The lipase may be pancreatic lipase, pregastric esterase or a fungal lipase such as Palatase 20,000L manufactured by Novo Nordisk Inc. or any mixture thereof. Although not wishing to be bound by theory, it is thought that the pregastric esterase hydrolyses the cheese curds to give free fatty acids of low molecular weight such as caproic acid and butyric acid which generate a desirable intense cheese flavor.

The temperature of the ripening may be from 20° to 45° C. and preferably from 30° to 40° C. The duration of the ripening may be conveniently from 2 to 5 days.

In performing the process of the present invention, the cheese curds are preferably slurried, for instance, in a liquefier with or without the addition of water. The protease and the lipase may be added to the curds, advantageously with agitation. Preferably the protease is added before the lipase. Preferably, the *Lactobacillus helveticus* and/or *Lactococcus lactis* is added last. The mixture is then ripened in a fermentation vessel with agitation. After ripening, sodium chloride may be added, if desired. A preservative agent such as potassium sorbate may be added, if desired. Consistency of the product can be stabilized by the addition of xanthan gum, if desired After ripening, the slurry is advantageously pasteurized, e.g. at 95° C. for from 5 to 20 minutes. Before pasteurization, the pH may be adjusted to 4.2 to 4.4, preferably with phosphoric acid. After pasteurization, the product is conveniently cooled, e.g. to a temperature of from 4° to 10° C. to give a product having the consistency of a paste.

The amount of cheese curds used may be from 50 to 90% by weight, the amount of water may be from 5 to 50% by weight, the amount of protease may be from 0.1 to 1.0% by weight and preferably from 0.15 to 0.75% by weight, the amount of lipase may be from 0.1 to 1.0% by weight and preferably from 0.2 to 0.75% by weight, and the amount of *Lactobacillus helveticus* and/or *Lactococcus lactis* may be from 0.2 to 2.5% by weight preferably from 0.4 to 2% by weight, all based on the total weight of the flavor.

The product may be used as a paste or dried and used as a powder. The drying is preferably achieved by spray drying, using a carrier, for instance, maltodextrin in an amount of from 20 to 40% by weight based on the weight of the paste. The moisture content of the final powder is usually from about 2.0 to 4.0% by weight.

The cheese flavor of the present invention may be incorporated in culinary food products, e.g. sauces, snacks, etc. The amount of cheese flavor used may be from 0.5 to 1.25% by weight in the paste form and from 0.2 to 0.6% by weight in the powder form based on the total weight of the food product.

The present invention therefore also provides a culinary food product containing a cheese flavor obtainable by the above described process according to the invention.

EXAMPLES

The following Examples further illustrate the present invention. Parts and percentages are expressed by weight.

Example 1

742.5 parts of frozen Parmesan cheese curd is thawed to room temperature and added to a liquefier and mixed for one minute. 115 parts of deionized water is added, followed by 1.5 parts of Prozyme 6, 4.6 parts of Neutrase, 3.0 parts of Pancreatic Lipase and 2 parts of Pregastric Esterase with a one minute mixing period between each enzyme to give a slur. A further 115 parts of water is used to rinse the weigh boats and added to the slurry. 16.7 parts of *Lactobacillus helviticus* is added and the slurry is mixed for one additional minute. The slurry is transferred to a fermentation vessel and ripe ned for 4 days at 37° C. with occasional shaking, After ripening, the slurry is pasteurized for 20 minutes at 95° C.

The pH is 5.2 at 25° C. and the moisture content is 51.7%. The product has a characteristic sharp Parmesan flavor.

The slurry is incorporated into Alfredo sauce in an amount of from 0.8 to 1.2% by weight based on the total weight of the sauce. It was found that the flavor was just as good when the amount of Parmesan cheese was reduced to 6% by weight as an Alfredo sauce which normally contains about 12% by weight of Parmesan cheese.

Example 2

Firstly, 202.1 parts of water is added to a liquefier and heated to 30–35° C. Then, 695.9 parts of frozen cheddar cheese block is thawed to room temperature, added to the liquefier and mixed for one minute, followed by 1.2 parts of Neutrase, 0.4 part of Protease P Amano 6, 3.4 parts of Pancreatic Lipase and 0.1 part of Palatase 20,000L with a one minute mixing period between each enzyme to give a slurry. Then, 3.8 parts of *Lactobacillus helveticus* is added and the slurry is mixed for one additional minute. The slurry is transferred to an incubation tank and ripened for 4 days at 37° C. After 2 days of incubation, 2.4 parts of *Lactococcus lactis* are added to the slurry. After ripening, a further 81.5 parts of water is used to disolve the xanthan gum (0.14 part) which is then added to the slurry. Then, 8.1 parts of sodium chloride and 1.0 part of potassium sorbate are added. The slurry has its pH adjusted to 4.2–4.4, and its moisture content adjusted to 54–58%. The slurry is then pasteurized for 5 minutes at 95° C. The product has a characteristic Cheddar cheese flavor.

The slurry is incorporated into Cheddar cheese sauce in an amount of from 0.8 to 1.0% by weight based on the total weight of the sauce. It was found that the flavor was just as good when the amount of Cheddar cheese was reduced to 26% by weight as an Cheddar cheese sauce which normally contains about 33% by weight of Cheddar cheese.

What is claimed is:

1. A process for the preparation of a cheese flavor which comprises ripening cheese curds with a neutral protease derived from *Aspergillus melleus, B. subtilis* var. *Amyloliquefaciens,* or *Aspergillus oryzae,* a lipase, and at least one of *Lactobacillus helveticus* or *Lactococcus lactis* for a ripening period of from 2 to 5 days to obtain the flavor.

2. A process according to claim 1 wherein the cheese curds are Cheddar cheese curds, Cheddar cheese blocks or Parmesan cheese block.

3. A process according to claim 1 wherein the lipase is a pancreatic lipase, a pregastric lipase, a fungal lipase or a mixture thereof.

4. A process according to claim 1 wherein the temperature during the ripening period is from 20° to 45° C.

5. A process according to claim 1 wherein the cheese curds are slurried, the protease and the lipase are added to the curds, the *Lactobacillus helveticus* and/or *Lactococcus lactis* is added, and the mixture is then ripened in a fermentation vessel.

6. A process according to claim 5 wherein the protease is added before the lipase.

7. A process according to claim 5 wherein the *Lactobacillus helveticus* and/or *Lactococcus lactis* is added last.

8. A process according to claim 1 wherein after ripening, the cheese flavor is pasteurized.

9. A process according to claim 8 wherein after pasteurization, the product is cooled to a temperature of from 4° to 10° C.

10. A process according to claim 1 wherein the amount of cheese curds used is from 50 to 90% by weight, water is added in an amount from 5 to 50% by weight, the amount of protease is from 0.1 to 1.0% by weight, the amount of lipase is from 0.1 to 1.0% by weight, and the amount of *Lactobacillus helveticus, Lactococcus lactis* or both is from 0.2 to 2.5% by weight, all based on the total weight of the flavor.

11. A process according to claim 1 wherein the cheese flavor is made into a paste or powder.

12. A process according to claim 11 wherein the moisture content of the final powder is from about 2.0 to 4.0% by weight.

* * * * *